United States Patent
Park et al.

(10) Patent No.: US 9,661,621 B2
(45) Date of Patent: May 23, 2017

(54) METHOD AND DEVICE FOR OBTAINING CONTROL INFORMATION IN A WIRELESS COMMUNICATION SYSTEM

(71) Applicant: LG ELECTRONICS INC., Seoul (KR)

(72) Inventors: Kyujin Park, Anyang-si (KR); Hangyu Cho, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 14/347,455

(22) PCT Filed: Sep. 25, 2012

(86) PCT No.: PCT/KR2012/007699
§ 371 (c)(1),
(2) Date: Mar. 26, 2014

(87) PCT Pub. No.: WO2013/048082
PCT Pub. Date: Apr. 4, 2013

(65) Prior Publication Data
US 2014/0241300 A1 Aug. 28, 2014

Related U.S. Application Data

(60) Provisional application No. 61/539,958, filed on Sep. 27, 2011.

(51) Int. Cl.
*H04W 72/04* (2009.01)
*H04L 5/00* (2006.01)

(52) U.S. Cl.
CPC ......... *H04W 72/042* (2013.01); *H04L 5/0041* (2013.01); *H04L 5/0053* (2013.01); *H04W 72/0453* (2013.01); *H04L 5/0007* (2013.01)

(58) Field of Classification Search
CPC ............ H04W 72/042; H04W 72/0453; H04L 5/0041; H04L 5/0053; H04L 5/0007
See application file for complete search history.

(56) References Cited

U.S. PATENT DOCUMENTS 8,520,619 B2 * 8/2013 Hong et al. ............. 370/329
2010/0302983 A1 * 12/2010 McBeath et al. ......... 370/311
(Continued)

FOREIGN PATENT DOCUMENTS

KR 10-2011-0000538 A 1/2011
KR 10-2011-0088432 A 8/2011
(Continued)

*Primary Examiner* — Kwang B Yao
*Assistant Examiner* — Moo Ryong Jeong
(74) *Attorney, Agent, or Firm* — Birch, Stewart, Kolasch & Birch, LLP

(57) ABSTRACT

An embodiment of the present invention relates to a method for obtaining control information on terminals in a wireless communication system. The method includes performing blind decoding on at least one of a first and a second area of a sub-frame. The first area includes a plurality of sets of one or more resource blocks that are not adjacent to the sub-frame and are continuous. The second area includes one or more continuous resource blocks on the sub-frame.

12 Claims, 11 Drawing Sheets

(56) References Cited

U.S. PATENT DOCUMENTS

| | | | |
|---|---|---|---|
| 2011/0171985 A1* | 7/2011 | Papasakellariou | H04W 72/02 455/509 |
| 2011/0274066 A1* | 11/2011 | Tee | H04L 5/001 370/329 |
| 2012/0099518 A1 | 4/2012 | Park et al. | |
| 2012/0287848 A1 | 11/2012 | Kim et al. | |
| 2013/0039291 A1* | 2/2013 | Blankenship et al. | 370/329 |

FOREIGN PATENT DOCUMENTS

| | | |
|---|---|---|
| WO | WO 2010/129605 A1 | 11/2010 |
| WO | WO 2010/141611 A2 | 12/2010 |
| WO | WO 2010/147426 A2 | 12/2010 |

\* cited by examiner

FIG. 11
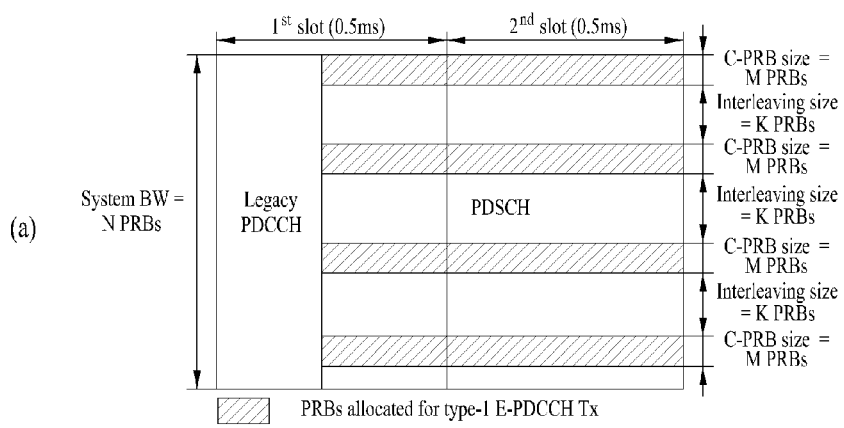
(a)
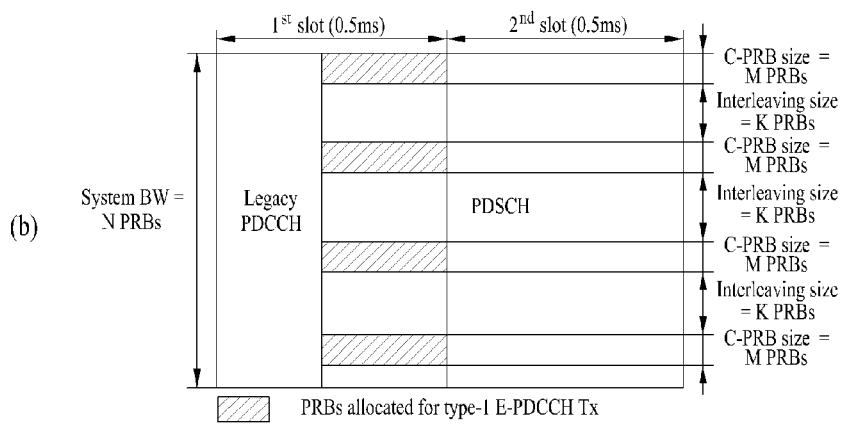
(b)

METHOD AND DEVICE FOR OBTAINING CONTROL INFORMATION IN A WIRELESS COMMUNICATION SYSTEM

CROSS REFERENCE TO RELATED APPLICATIONS

This non-provisional application is a National Stage entry under U.S.C. §371 of International Application No. PCT/KR2012/007699 filed on Sep. 25, 2012, which claims the benefit of U.S. Provisional Application No. 61/539,958 filed on Sep. 27, 2011. The entire contents of all of the above applications are hereby incorporated by reference.

TECHNICAL FIELD

The present invention relates to a method and apparatus for acquiring downlink control information in a wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide a method and apparatus for transceiving control information, and more particularly to a resource allocation method when e-PDCCH is introduced, and a blind decoding method associated with the resource allocation method.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for obtaining control information of a user equipment (UE) in a wireless communication system including: performing blind decoding of at least one of a first region and a second region of a subframe, wherein the first region includes a plurality of aggregations which are not contiguous to each other on the subframe, composed of one or more contiguous resource blocks (RBs) and the second region includes one or more contiguous resource blocks (RBs) on the subframe.

In a second technical aspect of the present invention, a method for transmitting control information of a base station (BS) in a wireless communication system includes: transmitting downlink control information using at least one of a first region and a second region of a subframe, wherein the first region includes a plurality of aggregations which are not contiguous to each other on the subframe, composed of one or more contiguous resource blocks (RBs) and the second region includes one or more contiguous resource blocks (RBs) on the subframe.

In a third technical aspect of the present invention, a user equipment (UE) for use in a wireless communication system includes: a reception (Rx) module; and a processor, wherein the processor performs blind decoding of at least one of a first region and a second region of a subframe, wherein the first region includes a plurality of aggregations which are not contiguous to each other on the subframe, composed of one or more contiguous resource blocks (RBs) and the second region includes one or more contiguous resource blocks (RBs) on the subframe.

In a fourth technical aspect of the present invention, a base station (BS) device for use in a wireless communication system includes: a transmission (Tx) module; and a processor, wherein the processor transmits downlink control information using at least one of a first region and a second region of a subframe, wherein the first region includes a plurality of aggregations which are not contiguous to each other on the subframe, composed of one or more contiguous resource blocks (RBs) and the second region includes one or more contiguous resource blocks (RBs) on the subframe.

The first to fourth technical aspects may include all or some parts of the following items.

The blind decoding of the first region may be for cell-specific control information, and the blind decoding of the second region may be for UE-specific control information.

The blind decoding of the first region may be for a fall-back downlink control information format, and the blind decoding of the second region may be for a downlink control information format associated with data transmission based on a plurality of layers.

The number and index of resource blocks (RBs) contained in the first region may be predetermined according to a downlink bandwidth.

At least one of the number of resource blocks (RBs) contained in each aggregation and the number of RBs corresponding to a spacing between the aggregations may be received from a base station (BS).

Each of the first region and the second region may not include a resource region indicated by a physical control format indicator channel (PCFICH) in the subframe.

Advantageous Effects

As is apparent from the above description, the embodiments of the present invention can efficiently perform resource allocation and blind decoding when E-PDCCH is introduced.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 11 and 12 are conceptual diagrams illustrating distributed resource allocation according to the embodiments of the present invention.

BEST MODE

Figure 1:
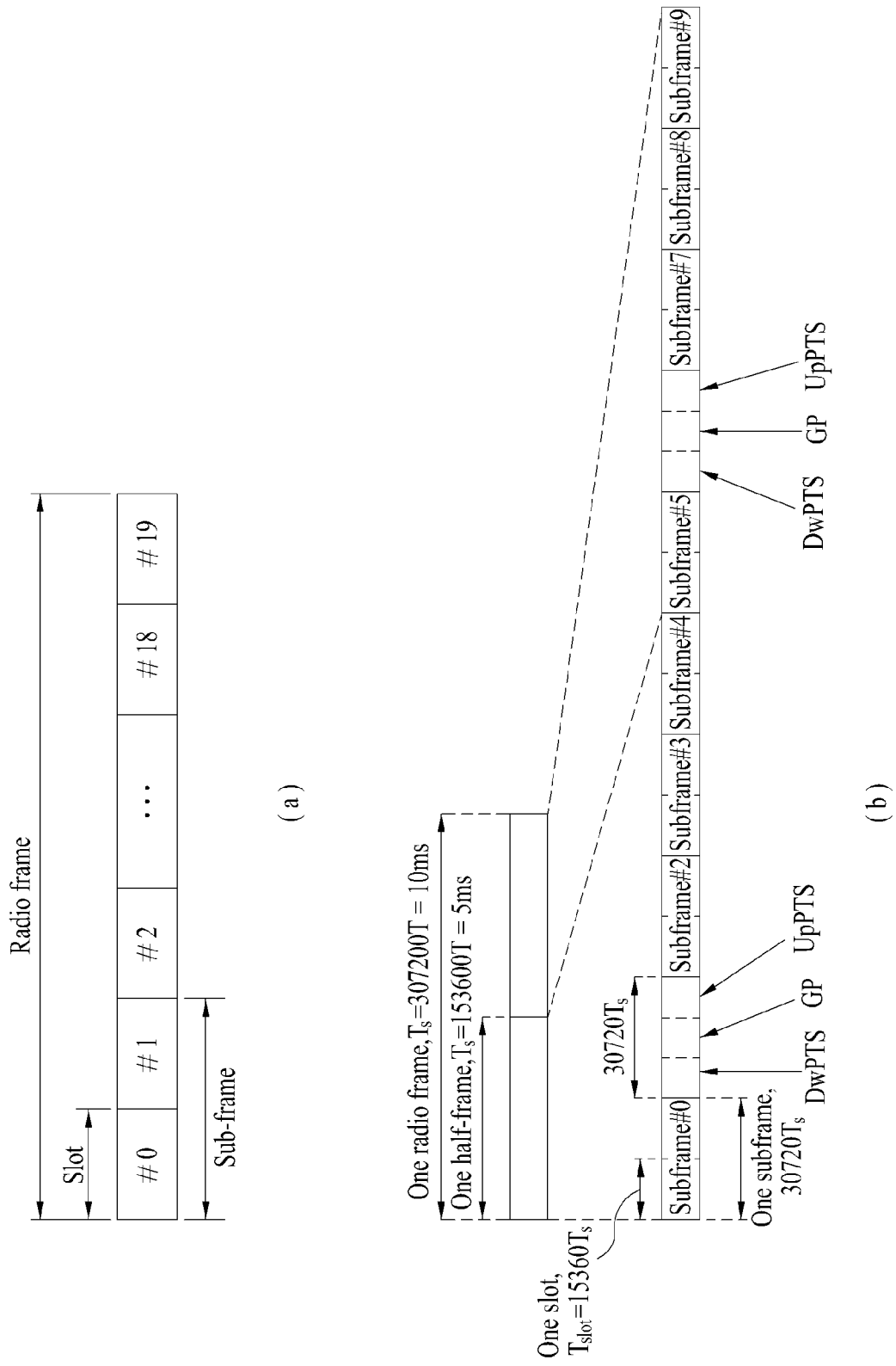
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

FIG. 1 exemplarily shows a radio frame structure for use in the LTE system. Referring to FIG. 1(a), a radio frame includes 10 subframes, and one subframe includes two slots in the time domain. A time required for transmitting one subframe is defined as a Transmission Time Interval (TTI). For example, one subframe may have a length of 1 ms and one slot may have a length of 0.5 ms. One slot may include a plurality of OFDM symbols in time domain. Since the LTE system uses OFDMA in downlink, the OFDM symbol indicates one symbol duration. One OFDM symbol may be called an SC-FDMA symbol or a symbol duration. An RB is a resource allocation unit and includes a plurality of contiguous subcarriers in one slot. The structure of the radio frame is only exemplary. Accordingly, the number of subframes included in one radio frame, the number of slots included in one subframe, or the number of OFDM symbols included in one slot may be changed in various manners.

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal.

The structure of the radio frame is only exemplary. Accordingly, the number of subframes included in the radio frame, the number of slots included in the subframe or the number of symbols included in the slot may be changed in various manners.

Figure 2:
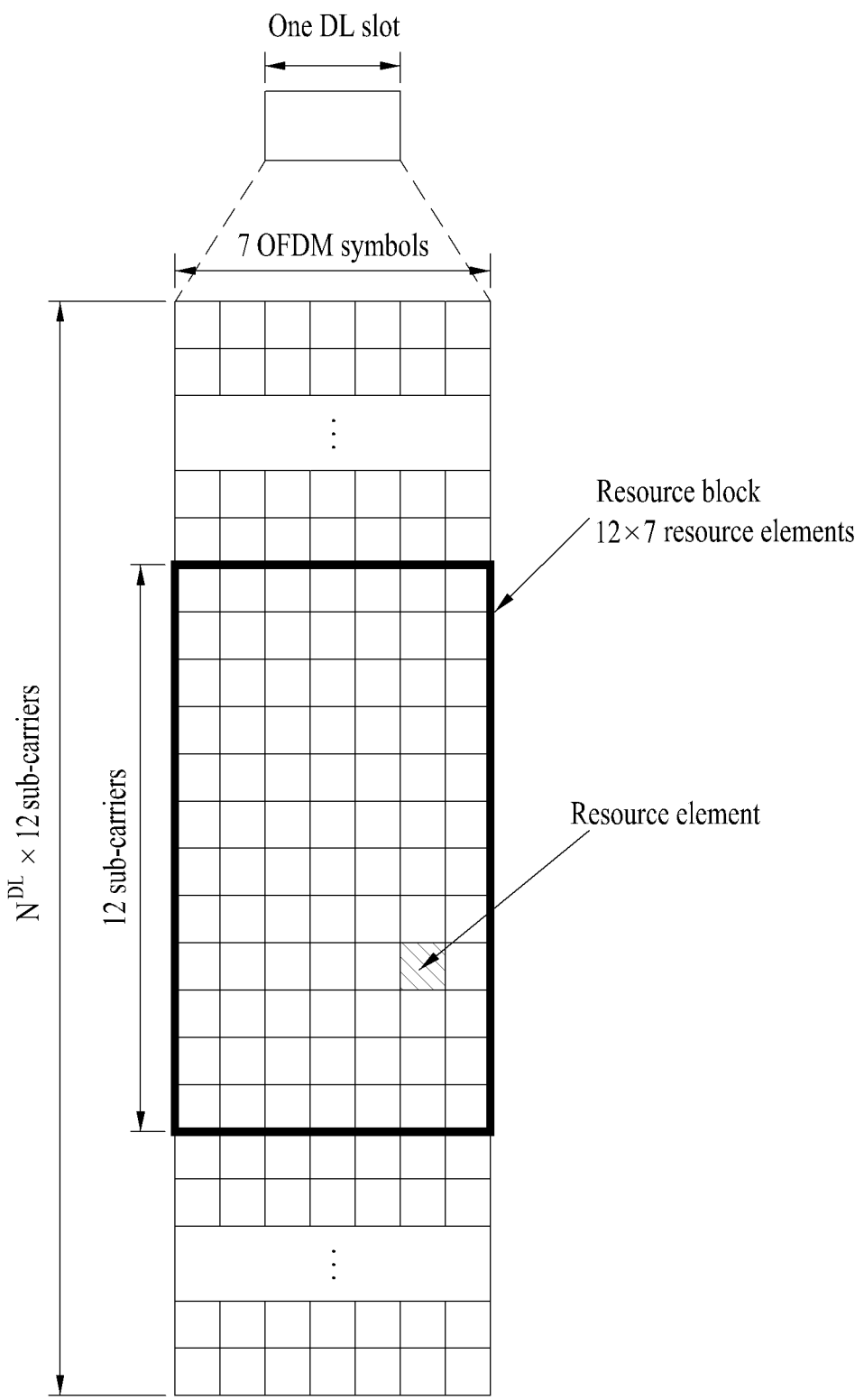
FIG. 2 exemplarily shows a resource grid of one downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
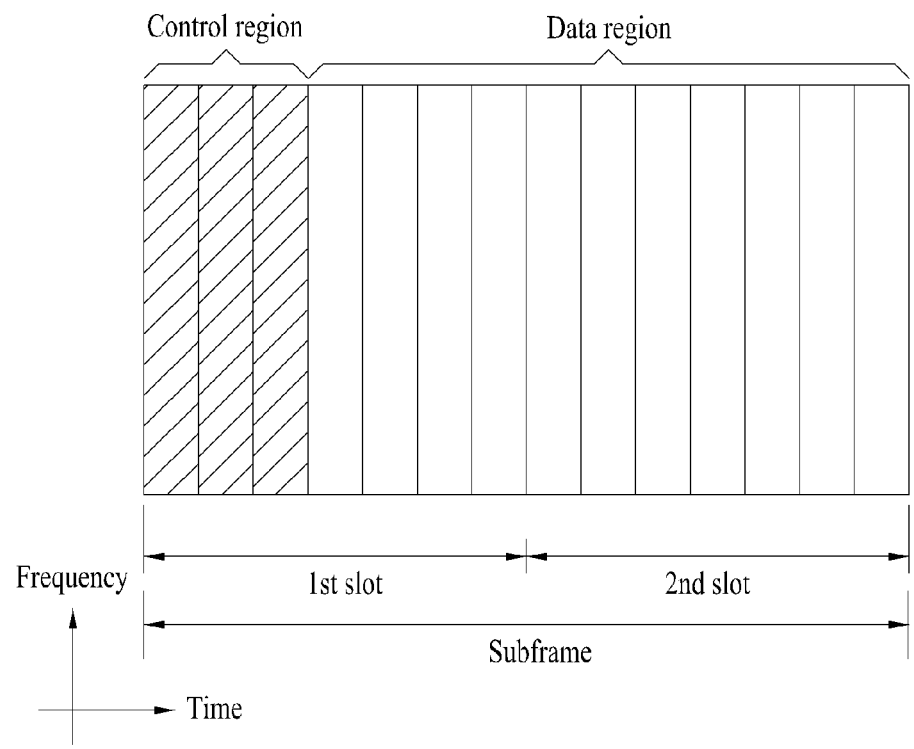
FIG. 3 exemplarily shows a downlink subframe structure.
Figure 4:
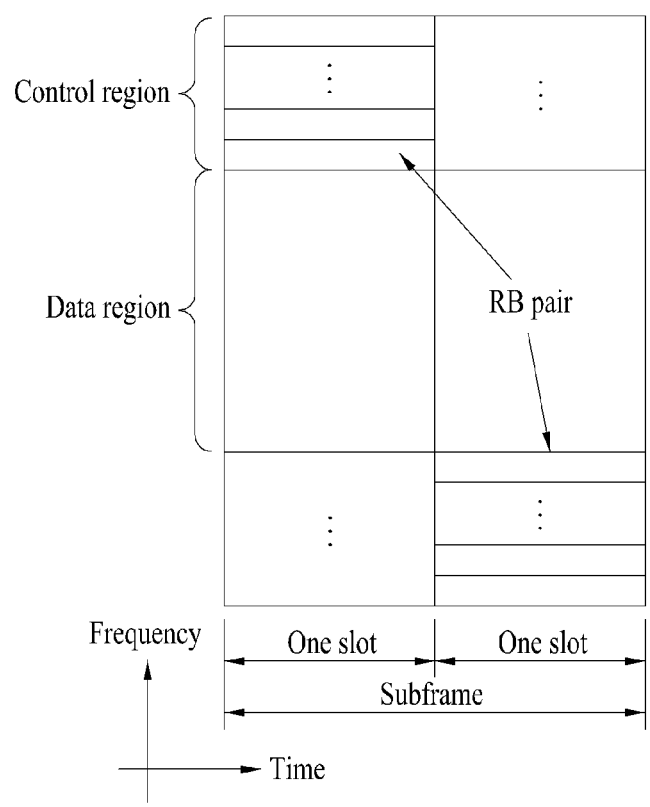
FIG. 4 exemplarily shows an uplink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc.

PCFICH is transmitted at a first OFDM symbol of a subframe, and includes information about the number of OFDM symbols used to transmit the control channel in the subframe.

PHICH includes a HARQ ACK/NACK signal as a response to uplink transmission.

The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc.

A plurality of PDCCHs may be transmitted within the control region. The UE may monitor the plurality of PDCCHs. PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

DCI Format

DCI formats 0, 1, 1A, 1B, 1C, 1D, 2, 2A, 2B, 2C, 3, 3A and 4 are defined in LTE-A (release 10). DCI formats 0, 1A, 3 and 3A have the same message size to reduce the number of blind decoding operations, which will be described later. The DCI formats may be divided into i) DCI formats 0 and 4 used for uplink scheduling grant, ii) DCI formats 1, 1A, 1B, 1C, 2, 2A, 2B and 2C used for downlink scheduling allocation, and iii) DCI formats 3 and 3A for power control commands according to purpose of control information to be transmitted.

DCI format 0 used for uplink scheduling grant may include a carrier indicator necessary for carrier aggregation which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission with respect to an HARQ process, a transmit power control (TPC) command for a scheduled PUSCH, information on a cyclic shift for a demodulation reference signal (DMRS) and OCC index, and an uplink index and channel quality indicator request necessary for a TDD operation, etc. DCI format 0 does not include a redundancy version, differently from DCI formats relating to downlink scheduling allocation, because DCI format 0 uses synchronous HARQ. The carrier offset is not included in DCI formats when cross-carrier scheduling is not used.

DCI format 4 is newly added to DCI formats in LTE-A release 10 and supports application of spatial multiplexing to uplink transmission in LTE-A. DCI format 4 has a larger message size because it further includes information for spatial multiplexing. DCI format 4 includes additional control information in addition to control information included in DCI format 0. DCI format 4 includes information on a modulation and coding scheme for the second transmission block, precoding information for multi-antenna transmission, and sounding reference signal (SRS) request information. DCI format 4 does not include the offset for format 0/format 1A differentiation because it has a size larger than DCI format 0.

DCI formats 1, 1A, 1B, 1C, 1D, 2, 2A, 2B and 2C for downlink scheduling allocation may be divided into DCI formats 1, 1A, 1B, 1C and 1D that do not support spatial multiplexing and DCI formats 2, 2A, 2B and 2C that support spatial multiplexing.

DCI format 1C supports only frequency contiguous allocation as compact frequency allocation and does not include the carrier indicator and redundancy version, compared to other formats.

DCI format 1A is for downlink scheduling and random access procedure. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission with respect to a HARQ process, a TPC command for a PUCCH, an uplink index necessary for a TDD operation, etc.

DCI format 1 includes control information similar to that of DCI format 1A. DCI format 1 supports non-contiguous resource allocation whereas DCI format 1A supports contiguous resource allocation. Accordingly, DCI format 1 further includes a resource allocation header, and thus slightly increases control signaling overhead as a trade-off for an increase in resource allocation flexibility.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C may be regarded as an extended version of DCI format 2B and supports spatial multiplexing for up to 8 layers.

DCI formats 3 and 3A may be used to complement the TPC information included in the aforementioned DCI formats for uplink scheduling grant and downlink scheduling allocation, that is, to support semi-persistent scheduling. A 1-bit command is used per UE in the case of DCI format 3 whereas a 2-bit command is used per UE in the case of DCI format 3A.

One of the above-mentioned DCI formats is transmitted through a PDCCH, and a plurality of PDCCHs may be transmitted in a control region. A UE can monitor the plurality of PDCCHs.

Downlink Control Channel Structure

The first three OFDM symbols for each subframe can be basically used as a transmission region of a downlink control channel, and the first to third OFDM symbols may be used according to overhead of a downlink control channel. PCFICH may be used to adjust the number of OFDM symbols for a downlink control channel per subframe. In order to provide acknowledgement/negative acknowledgment (ACK/NACK) information for uplink transmission on downlink, a Physical Hybrid-automatic repeat request (ARQ) Indicator Channel (PHICH) may be used. In addition, a PDCCH may be used to transmit either control information for downlink data transmission or control information for uplink data transmission.

Figure 5:
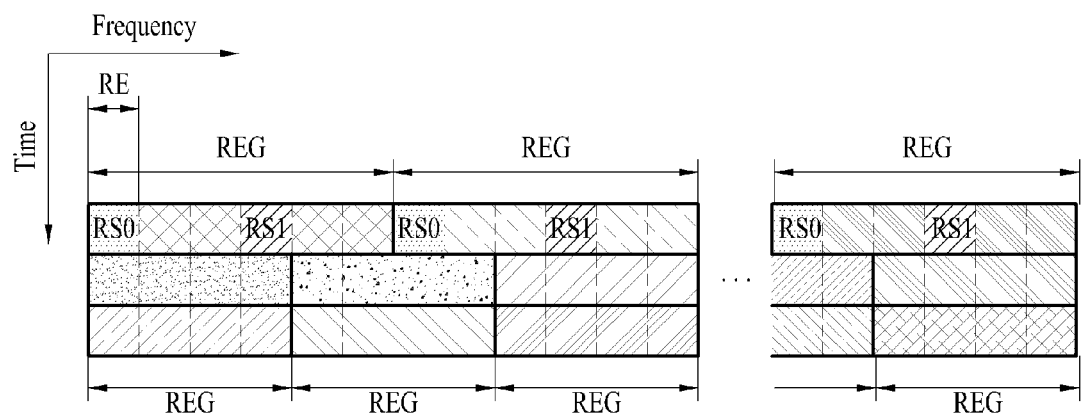
FIGS. 5 and 6 exemplarily show a resource element group (REG) serving as an allocation unit of a downlink control channel.
Figure 6:
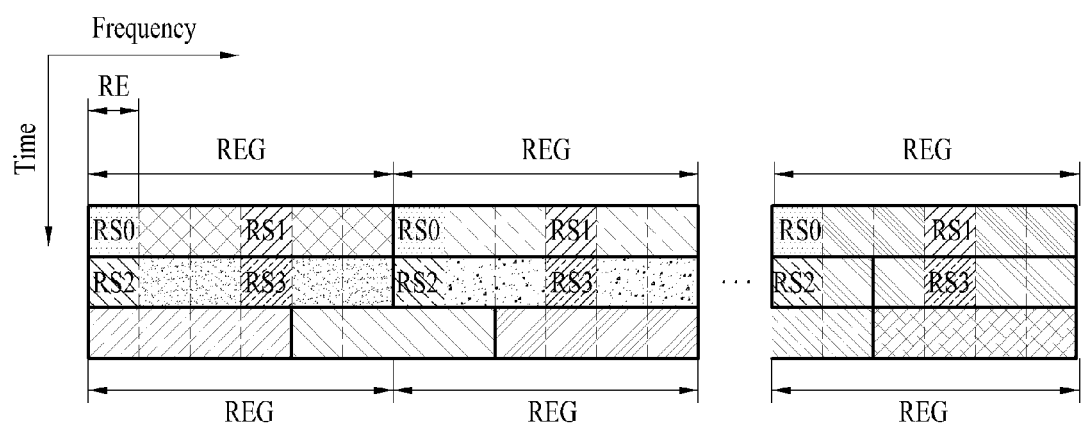

FIGS. 5 and 6 exemplarily show that the above-mentioned downlink control channels are allocated in units of a resource element group (REG) in a control region for each subframe. In more detail, FIG. 5 shows a system having 1Tx antenna or 2Tx antennas, and FIG. 6 shows a system having 4Tx antennas. As can be seen from FIGS. 5 and 6, an REG serving as a basic resource unit to which a control channel is allocated is composed of 4 concatenated resource elements (REs) in a frequency domain other than some REs to which reference signals are allocated. A predetermined number of REGs may be used to transmit a downlink control channel according to downlink control channel (DCH) overhead.

PCFICH (Physical Control Format Indicator Channel)

In order to provide resource allocation information or the like of the corresponding subframe to each subframe, a PDCCH may be transmitted among OFDM symbol indices #0 to #2. In accordance with overhead of a control channel, an OFDM symbol index #0 may be used, OFDM symbol indices #0 and #1 may be used, or OFDM symbol indices #0 to #2 may be used. The number of OFDM symbols used by a control channel may be changed per subframe, and information regarding the number of OFDM symbols may be provided over a PCFICH. Therefore, PCFICH must be transmitted per subframe.

Three kinds of information can be provided through a PCFICH. The following Table 1 shows a Control Format Indicator of a PCFICH. CFI=1 denotes that a PDCCH is transmitted at OFDM symbol index #0, CFI=2 denotes that a PDCCH is transmitted at OFDM symbol indices #0 and #1, and CFI=3 denotes that a PDCCH is transmitted at OFDM symbol indices #0 to #2.

TABLE 1

| CFI | CFI codeword $<b_0, b_1, \ldots, b_{31}>$ |
|---|---|
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

Information transmitted over a PCFICH may be differently defined according to system bandwidth. For example, if a system bandwidth is less than a specific threshold value, CFI=1, CFI=2, and CFI=3 may indicate that two OFDM symbols, three OFDM symbols, and four OFDM symbols are used for a PDCCH, respectively.

Figure 7:
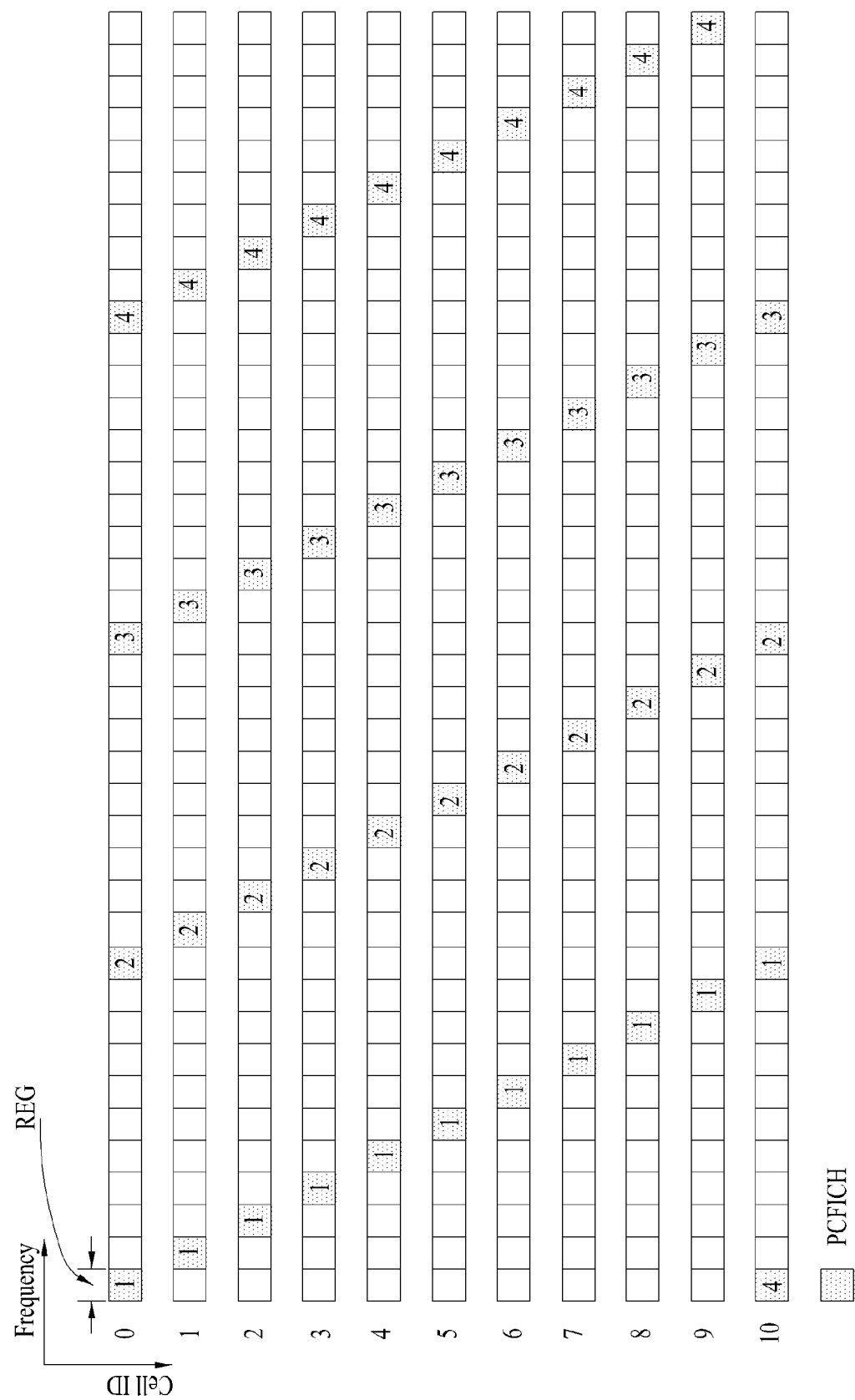
FIG. 7 is a conceptual diagram illustrating a Physical Control Format Indicator Channel (PCFICH) transmission scheme.

FIG. 7 is a conceptual diagram illustrating a PCFICH transmission scheme. An REG shown in FIG. 7 may be composed of 4 subcarriers, and may be composed only of data subcarriers other than a reference signal (RS). Generally, a transmit diversity scheme may be applied to the REG. To prevent inter-cell interference of the PCFICH, the REGs to which the PCFICH is mapped may be shifted per cell in the frequency domain (according to a cell ID). The PCFICH is transmitted at the first OFDM symbol of a subframe all the time. Accordingly, when receiving a subframe, the receiver first confirms PCFICH information, and recognizes the number of OFDM symbols needed for PDCCH transmission, such that it can receive control information transmitted over a PDCCH.

Physical Hybrid-ARQ Indicator Channel (PHICH)

Figure 8:
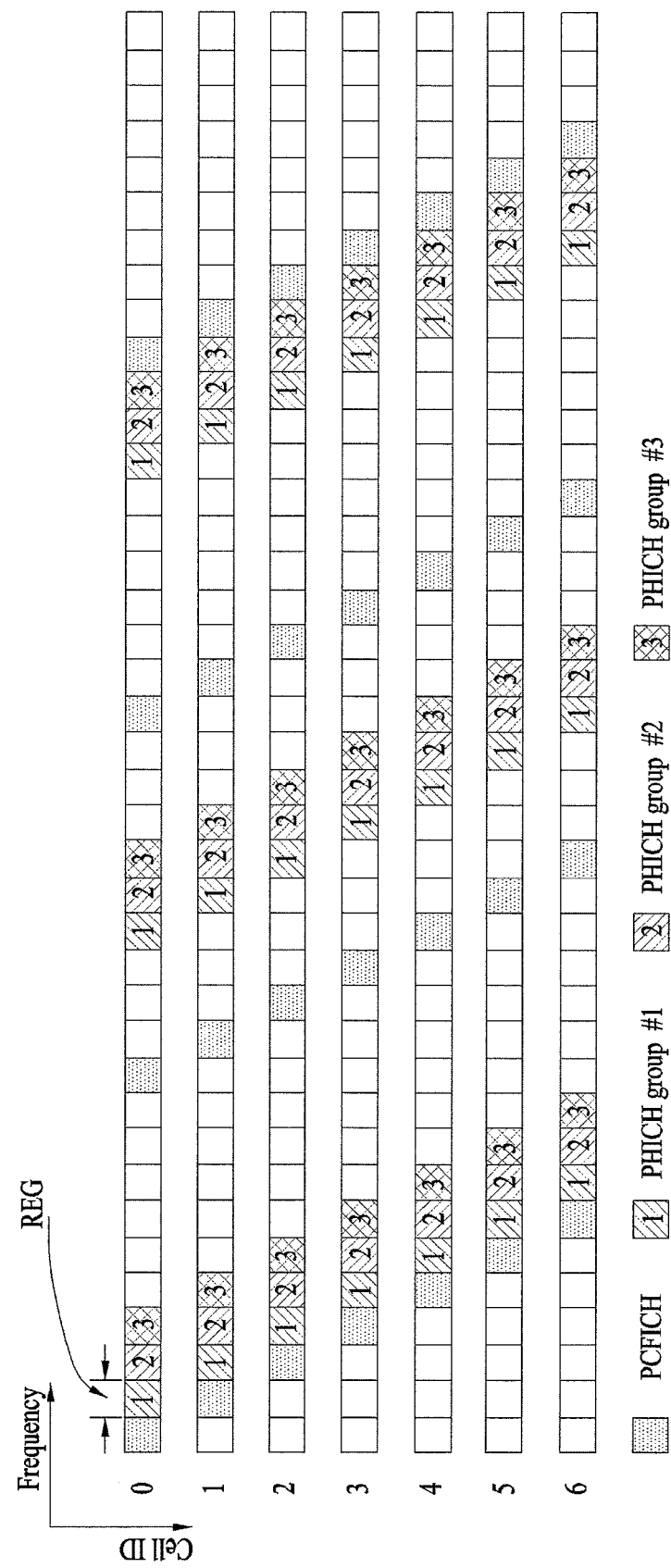
FIG. 8 shows the positions of a PCFICH and a Physical hybrid ARQ indicator Channel (PHICH).

FIG. 8 shows the positions of PCFICH and PHICH generally applied to a specific bandwidth. ACK/NACK information for uplink data transmission is transmitted over a PHICH. A plurality of PHICH groups is constructed in a single subframe, and a plurality of PHICHs may be present in a single PHICH group. Therefore, PHICH channels for multiple UEs are contained in a single PHICH group.

Referring to FIG. 8, allocating a PHICH to each UE of a plurality of PHICH groups is achieved not only using a lowest physical resource block (PRB) index of a PUSCH resource allocation but also a cyclic shift (CS) index for a demodulation RS (DMRS) transmitted on a UL grant PDCCH. DMRS is an uplink reference signal, and is provided along with UL transmission so as to perform channel estimation for demodulating UL data. In addition, a PHICH resource is signaled as an index pair such as $(n_{PHICH}^{group}, n_{PHICH}^{seq})$. In the index pair $(n_{PHICH}^{group}, n_{PHICH}^{seq})$, $n_{PHICH}^{group}$ denotes a PHICH group number and $n_{PHICH}^{seq}$ denotes an orthogonal sequence index in the corresponding PHICH group. $n_{PHICH}^{group}$ and $n_{PHICH}^{seq}$ are defined as shown in the following equation 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH}$$

[Equation 1]

In Equation 1, $n_{DMRS}$ denotes a cyclic shift of a DMRS used for uplink transmission related to a PHICH, and is mapped to a value of 'cycle shift for DMRS' field of the latest UL grant control information (e.g., DCI format 0 or 4) for a transport block (TB) associated with the corresponding PUSCH transmission. For example, the 'cyclic shift for DMRS' field of the latest UL grant DCI format may be 3 bits long. If the 'cyclic shift for DMRS' field is set to "000", $n_{DMRS}$ may be set to zero '0'.

In Equation 1, $N_{SF}^{PHICH}$ denotes the size of a spreading factor used for PHICH modulation. $I_{PRB\_RA}^{lowest\_index}$ is the lowest PRB index of a first slot of the corresponding PUSCH transmission. $I_{PHICH}$ is set to the value of 1 only when the TDD system is in a special case (if UL/DL configuration is set to zero '0' and PUSCH transmission is achieved at subframe n=4 or n=9, and $I_{PHICH}$ is set to zero '0' in the remaining cases other than the special case. $N_{PHICH}^{group}$ denotes the number of PHICH groups configured by a higher layer. $N_{PHICH}^{group}$ can be obtained using the following equation 2.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Equation 2]

In Equation 2, $N_g$ denotes information regarding the amount of PHICH resources transmitted on a physical broadcast channel (PBCH), and $N_g$ is 2 bits long and is denoted by $N_g \in \{1/6, 1/2, 1, 2\}$. In Equation 2, $N_{RB}^{DL}$ denotes the number of resource blocks (RBs) configured in downlink.

In addition, examples of orthogonal sequences defined in the legacy 3GPP LTE Release 8/9 are shown in the following table 2.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 9:
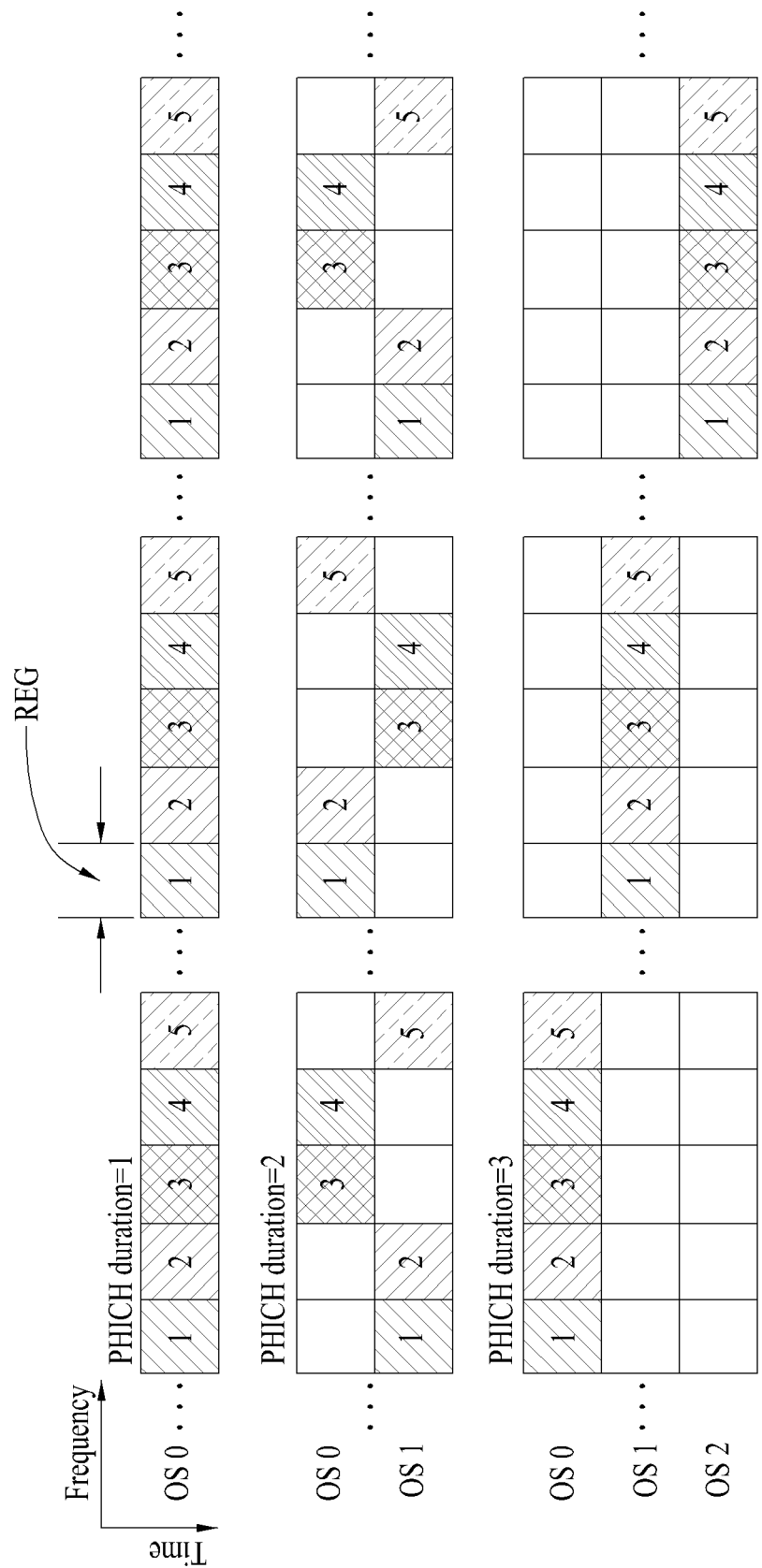
FIG. 9 shows a downlink resource element position mapped to a PHICH group.

FIG. 9 shows a downlink resource element position mapped to a PHICH group. A PHICH group may be constructed in different time domains (i.e., different OFDM Symbols (OSs)) of a single subframe shown in FIG. 9 according to PHICH duration.

PDCCH Processing

When PDCCHs are mapped to REs, control channel elements (CCEs) corresponding to contiguous logical allocation units are used. A CCE includes a plurality of (e.g. 9) REGs and an REG includes 4 neighboring REs except for a reference signal (RS).

The number of CCEs necessary for a specific PDCCH depends on a DCI payload corresponding to control information size, cell bandwidth, channel coding rate, etc. Specifically, the number of CCEs for a specific PDCCH can be determined based on PDCCH format shown in Table 3.

TABLE 3

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

While one of the above-mentioned four PDCCH formats may be used, this is not signaled to a UE. Accordingly, the UE performs decoding without knowing the PDCCH format, which is referred to as blind decoding. Since operation overhead is generated if a UE decodes all CCEs that can be used for downlink for each PDCCH, a search space is defined in consideration of limitation for a scheduler and the number of decoding attempts.

The search space is a set of candidate PDCCHs composed of CCEs on which a UE needs to attempt to perform decoding at an aggregation level. The aggregation level and the number of candidate PDCCHs can be defined as shown in Table 4.

TABLE 4

| | Search space | | The number of |
|---|---|---|---|
| | Aggregation level | Size (CCE unit) | PDCCH candidates |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 4, the UE has a plurality of search spaces at each aggregation level because 4 aggregation levels are present. The search spaces may be divided into a UE-specific search space and a common search space, as shown in Table 4. The UE-specific search space is for a specific UE. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space is used for a case in which a plurality of UEs or all UEs need to receive PDCCHs, for system information dynamic scheduling or paging messages, for example. The common search space may be used for a specific UE for resource management. Furthermore, the common search space may overlap with the UE-specific search space.

The search space may be decided by the following equation 3.

$$L \cdot \{(Y_k+m') \bmod \lfloor N_{CCE,k}/L \rfloor\}+i \quad \text{[Equation 3]}$$

In Equation 3, L is an aggregation level, $Y_k$ is a variable decided by RNTI and subframe number (k), m' is the number of PDCCH candidates. If carrier aggregation (CA) is used, m' is denoted by $m'=m+M^{(L)} \cdot n_{CI}$. If CA is not used, m' is denoted by m'=m, where m=0, . . . , $M^{(L)}-1$. $M^{(L)}$ is the number of PDCCH candidates. $N_{CCE,k}$ is a total number of CCEs of a control region at the k-th subframe. i is an index for determination of a separate CCE in each PDCCH candidate in the PDCCH and satisfies i=0, . . . , L−1. In a common search space, $Y_k$ is always set to zero '0'.

Figure 10:
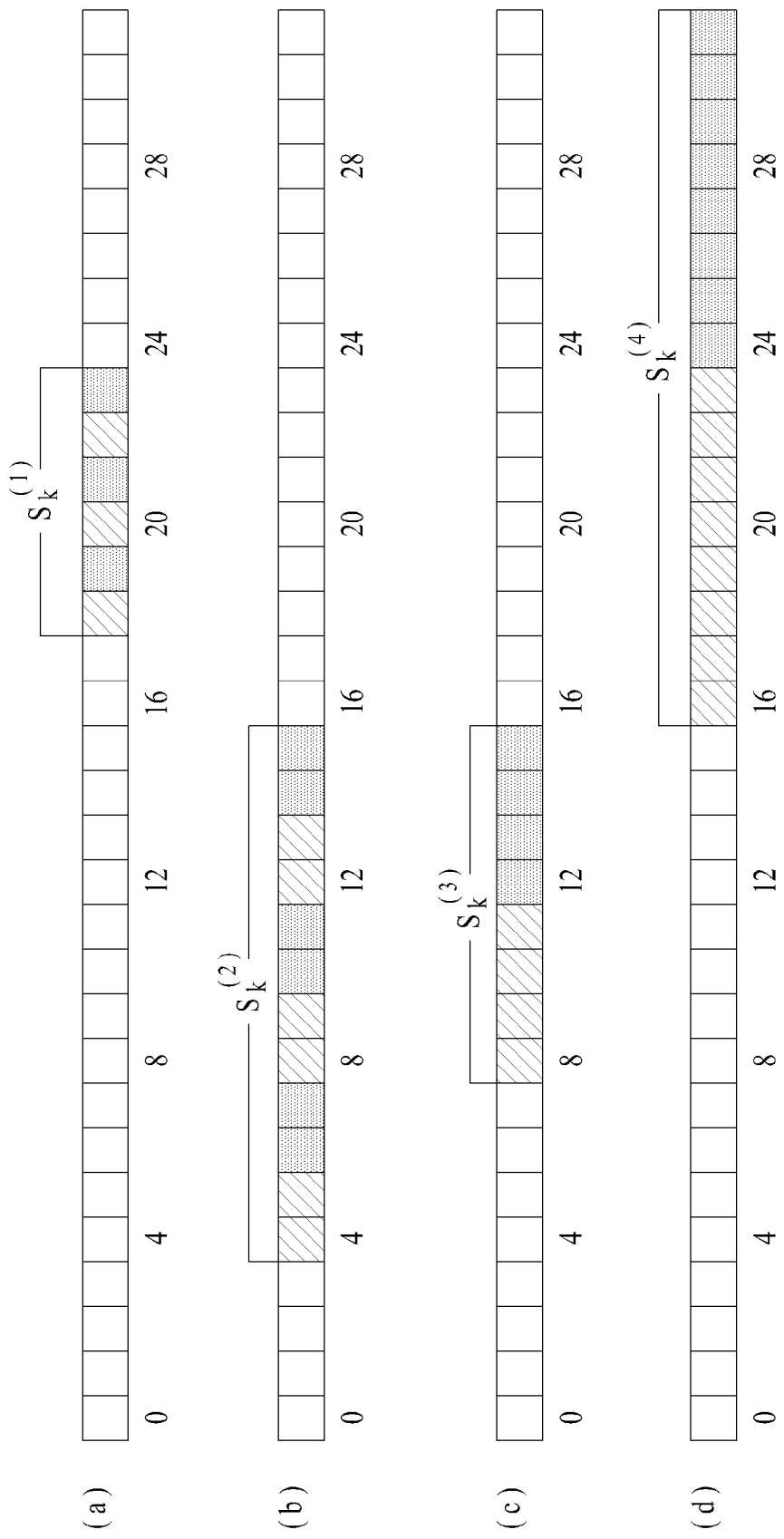
FIG. 10 is a conceptual diagram illustrating a search space at each aggregation level.

FIG. 10 is a conceptual diagram illustrating a UE-specific search space (shaded part) in each aggregation level defined by Equation 3. In FIG. 10, it should be noted that carrier aggregation (CA) is not used and the number of $N_{CCE,k}$ is exemplarily set to 32.

FIGS. 10(a), 10(b), 10(c), and 10(d) show a case of an aggregation level '1', a case of an aggregation level '2', a case of an aggregation level '4', and a case of an aggregation level '8', respectively. In FIG. 10, a start CCE of a search space in each aggregation level is determined to be an RNTI and subframe number (k), and may have different values according to individual aggregation levels due to a modulo function and an aggregation level (L) within the same subframe for one UE. The start CCE may always be set only to a multiple of an aggregation level due to the aggregation level (L). In this case, it is premised that $Y_k$ is set to, for example, a CCE number #18. The UE attempts to sequentially perform decoding from the beginning of a start CCE in units of CCEs decided by the corresponding aggregation level. For example, as can be seen from FIG. 10(b), the UE attempts to perform decoding on the basis of two CCEs according to an aggregation level from the beginning of a CCE number #4 acting as a start CCE.

The UE attempts to decode a search space, as described above. The number of decoding attempts is determined by DCI format and transmission mode determined through RRC signaling. When carrier aggregation (CA) is not applied, the UE needs to perform a maximum of 12 decoding attempts because 2 DCI sizes (DCI format 0/1A/3/3A and DCI format 1C) have to be considered for each of 6 PDCCH candidates for a common search space. For a UE-specific search space, 2 DCI sizes are considered for (6+6+2+2=16) PDCCH candidates and thus a maximum of 32 decoding attempts is needed. Accordingly, a maximum of 44 decoding attempts needs to be performed when carrier aggregation (CA) is not applied.

On the other hand, if carrier aggregation (CA) is used, as many UE-specific search space as the number of DL resources (component carriers: CCs) and a decoding process for DCI format 4 are further added, such that a maximum number of decoding times can be increased indefinitely.

All UEs for use in the above-mentioned legacy LTE/LTE-A system have disclosed DCI on the basis of PDCCH transmitted on resources indicated by PCFICH, a method for allocating a new structure and a new PDCCH operating in a transmission mode to a PDSCH region in consideration of not only various cell deployment scenarios such as RRH (Remote Radio Head) but also MIMO (Multiple Input Multiple Output) such as a feedback-based closed-loop beamforming of a UE has been intensively discussed in LTE Release 11 or greater. A newly defined PDCCH will hereinafter be referred to as E-PDCCH, and a conventional PDCCH will hereinafter be referred to as a legacy PDCCH.

An E-PDCCH structure indicating which one of resource regions in the PDSCH region will be used by E-PDCCH having the increasing necessity, and UE operations associated with the E-PDCCh structure will hereinafter be described. The E-PDCCH structure of the present invention may be classified into a first-region shaped structure (hereinafter referred to as "Type-1 E-PDCCH") in which one or more contiguous RB aggregations are distributed to a total bandwidth of a subframe and a second-region shaped structure (hereinafter referred to as "Type-2 E-PDCCH") composed of contiguous RBs in at least some parts of the total bandwidth of the subframe. For convenience of description, the E-PDCCH structure of each type and blind decoding of the UE will hereinafter be described in detail.

FIG. 11 exemplarily shows the Type-1 E-PDCCH structure according to the embodiment. Type-1 E-PDCCH structure may be configured in the form of FDM as shown in FIG. 11(a), or may also be configured in the form of FDM/TDM as shown in FIG. 11(b). However, the Type-1 E-PDCCH structure of the present invention is not limited to FIG. 11, and the scope of the present invention may also be applied to other examples in which data is distributed on a frequency axis composed of one or more contiguous resource block aggregations not contiguous to each other on a total bandwidth of the subframe.

The distributed Type-1 E-PDCCH structure on a frequency axis shown in FIG. 11 can determine a detailed resource region on the condition that the corresponding resource region is predetermined and specific information as to which type corresponds to the UE, or all or some information of the E-PDCCH region is signaled from the BS, and a detailed resource region can be determined.

Individual cases will hereinafter be described in detail. First, the Type-1 E-PDCCH structure may be predetermined Specifically, the resource region to which E-PDCCH can be transmitted may be constantly configured irrespective of a DL bandwidth, so that indexes of the distributed RBs may be configured as necessary. For example, a total number ($N_{RB}$) of RBs to be used for E-PDCCH transmission is fixed to 16 irrespective of the DL bandwidth. If four RB aggregations each of which includes four contiguous RBs are distributed to a downlink bandwidth, the detailed position may be predetermined as shown in 0, 1, 2, 3, [$N_{RB}$/3], [$N_{RB}$/3]+1, [$N_{RB}$/3]+2, [$N_{RB}$/3]+3, [$2N_{RB}$/3], [$2N_{RB}$/3]+1, [$2N_{RB}$/3]+2, [$2N_{RB}$/3]+3, $N_{RB}$−4, $N_{RB}$−3, $N_{RB}$−2, $N_{RB}$−1. However, the number of contiguous RBs contained in the RB aggregation and/or a detailed position at which RB aggregations are distributed is only exemplary, and may be changed to another as necessary.

On the other hand, the resource region to be used for E-PDCCH transmission may be dependent upon the DL bandwidth, and associated examples are shown in the following Table 5.

TABLE 5

| System BW, NRB | Type-1 E-PDCCH size, L | E-PDCCH Location, Ni, i = RB index |
|---|---|---|
| 6-10 | 0 | N/A |
| 11 | 4 | i = 0, 1, NRB-2, NRB-1 |
| 12-19 | 4 | i = 0, 1, NRB-2, NRB-1 |
| 20-26 | 4 | i = 0, 1, NRB-2, NRB-1 |
| 27-44 | 8 | i = 0, 1, [NRB/3], [NRB/3] + 1, [2NRB/3], [2NRB/3] + 1, NRB-2, NRB-1 |
| 45-49 | 8 | i = 0, 1, [NRB/3], [NRB/3] + 1, [2NRB/3], [2NRB/3] + 1, NRB-2, NRB-1 |
| 50-63 | 8 | i = 0, 1, [NRB/3], [NRB/3] + 1, [2NRB/3], [2NRB/3] + 1, NRB-2, NRB-1 |
| 64-79 | 16 | i = 0, 1, 2, 3, [NRB/3], [NRB/3] + 1, [NRB/3] + 2, [NRB/3] + 3, [2NRB/3], [2NRB/3] + 1, [2NRB/3] + 2, [2NRB/3] + 3, NRB-4, NRB-3, NRB-2, NRB-1 |
| 80-110 | 16 | i = 0, 1, 2, 3, [NRB/3], [NRB/3] + 1, [NRB/3] + 2, [NRB/3] + 3, [2NRB/3], [2NRB/3] + 1, [2NRB/3] + 2, [2NRB/3] + 3, NRB-4, NRB-3, NRB-2, NRB-1 |

In Table 5, [L] is a maximum integer not exceeding '[L]=L'.

In Table 5, if a downlink system BW is 40 RBs, a resource region to be used for total E-PDCCH transmission is 8 RBs, and a detailed position of the 8 RBs may be denoted by 0, 1, [NRB/3], [NRB/3]+1, [2NRB/3], [2NRB/3]+1, NRB−2, NRB−1 (i.e., RB indexes 0, 1, 13, 14, 26, 27, 38, 39). In other words, four contiguous RB aggregations each of which includes 2 RBs are distributed on a downlink bandwidth composed of 40 RBs.

In Table 5, if the Type-1 E-PDCCH structure is predetermined according to the DL bandwidth, this information may be transferred through RRC signaling, system information, etc.

Subsequently, after the UE receives signaling information indicating all or some information of the E-PDCCH region from the BS, a detailed resource region may be determined on the basis of the received information. In this case, the BS may dynamically change the Type-1 E-PDCCH structure so as to obtain scheduling information. In a detailed method, a Control Format Indicator (CFI) field indicating RB allocation information is defined, and the CFI field may be transferred to the UE. The CFI field may include the number (M) of contiguous RBs contained in the RB aggregation and/or the number (K) of RBs corresponding to a spacing between RB aggregations distributed to the downlink bandwidth.

Figure 12:
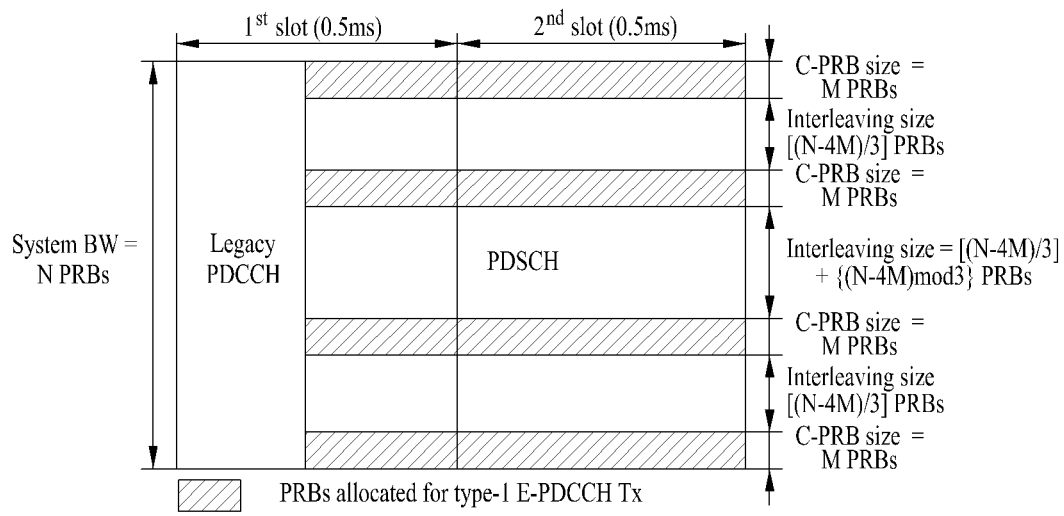

M and K may be signaled, or any one of M and K may be signaled, and the remaining one value may be determined by the UE on the basis of the signaled information. For example, if the DL bandwidth is composed of N RBs and the M value is signaled, the K value may be determined to be floor((N−4M)/3). In this case, if (N−4M)/3 is not divided without a remainder, RB corresponding to '(N−4M) mod 3' indicating a remainder may be contained in the spacing between aggregations including the center of the frequency band as shown in FIG. 12.

In addition, M may be set to a fixed value, the number (L) of RBs contained in E-PDCCH is signaled, and the spacing (K) between the aggregations may be determined on the basis of the signaled information. For example, if M may be fixed to '1' and L may be signaled as '6', the spacing (K) between aggregations, each of which includes one BR, may be determined by floor((N−6)/5).

Alternatively, if the number of RB aggregations is fixed (for example, if the number of RB aggregations may be fixed to 2, 3, 4 according to a diversity order to be guaranteed on the frequency axis), and L is signaled, such that M may be determined to be L/2, L/3, or L/4.

The above signaling variable may be transferred as an absolute value, or a detailed value dependent upon configuration information according to the table mapping scheme may be mapped as necessary.

If resource allocation information of the Type-1 E-PDCCH structure is signaled according to the above methods, the corresponding information may be semi-statically configured through cell-specific/UE-specific higher layer signaling such that the configure information may be transferred to the UE. Alternatively. The corresponding information is dynamically configured per subframe, and may be signaled through a fixed position (for example, N-th CCE or N~(N+k)-th CCE) of the legacy PDCCH. E-PCFICH may be newly defined at a fixed position of the PDSCH region, and the corresponding information may be signaled through the defined E-PCFICH. For example, E-PCFICH is defined through both edge RBs of the downlink bandwidth, such that resource allocation information of the Type-1 E-PDCCH structure may be transferred as necessary.

A CCE structure acting as a DCI transmission unit in the above-mentioned Type-1 E-PDCCH region may be composed of 9 REGs, each of which includes 4 REs, in association with available REs other than REs other than REs needed for RS as in the legacy PDCCH. In this case, interleaving between REGs can be applied in the same manner as in the legacy LTE/LTE-A system. In addition, a new CCE structure may be configured for E-PDCCH differently from the legacy LTE/LTE-A. For example, 18 REs may be contained in one CCE.

Figure 13:
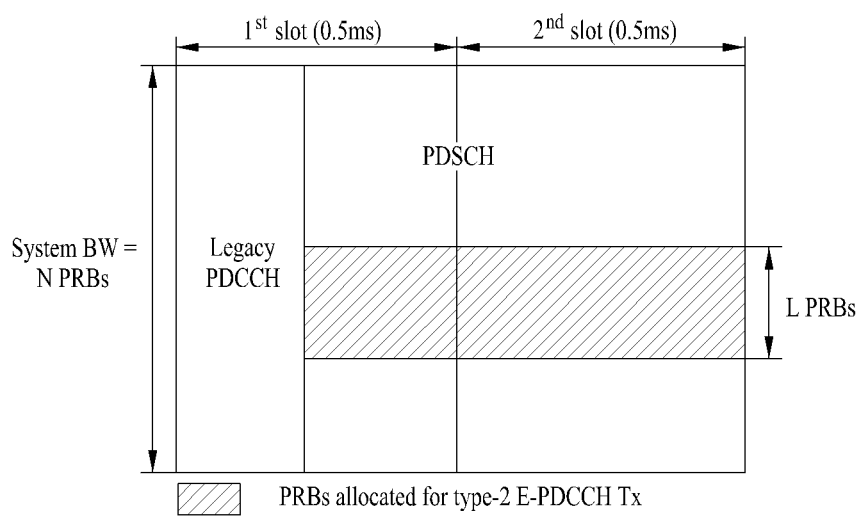
FIG. 13 is a conceptual diagram illustrating contiguous resource allocation according to the embodiments of the present invention.

FIG. 13 is a conceptual diagram illustrating the Type-2 E-PDCCH structure. The Type-2 E-PDCCH structure may include one or more contiguous RBs (L PRBs of FIG. 3) contiguous to each other on a frequency axis in the downlink bandwidth.

In accordance with the Type-2 E-PDCCH structure, a search space may be UE-specifically configured from the viewpoint of the UE or E-PDCCH transmission resources.

That is, the type-2 E-PDCCH may support only USS, and may support only UE-specific control channel transmission. Type-2 E-PDCCH may support only closed-loop MIMO transmission mode based on DMRS. RB allocation information for Type-2 E-PDCCH transmission may be transmitted through higher layer signaling per UE, or may be determined as a function of a UE identifier (C-RNTI). For allocation of the Type-2 E-PDCCH resource region using the C-RNTI, a hash function for deciding the UE-specific search space may be used in the legacy LTE/LTE-A system. In the same manner as in the method for deciding the search space using the above equation 3, the hash function may also be decided by the following equation 4, a total number $N_{CCE,k}$ of CCEs contained in the control region at the k-th subframe may be replaced with a total number $N_{RB}$ of RBs of the downlink bandwidth.

$$(Z_k^{(L)}+i)+\mod N_{CCE,k}, (i=0,1,\ldots,M^{(L)}\cdot L-1)$$ [Equation 4]

In Equation 4, $Z_k^{(L)}$ denotes a start position of the search space, and may be determined by the following equation.

$$Z_k^{(L)}=L\cdot(Y_k \mod \lfloor N_{CCE,k}/L \rfloor)$$

$$Y_k=(A\cdot Y_{k-1})\mod D$$

$$(Y_{-1}=n_{RNTI}\neq 0, A=39827, D=65537.)$$

Where $M^{(L)}$ is the number of PDCCH candidates.

On the other hand, as compared to the legacy PDCCH region in which both CSS and USS are transmitted, CSS may be transmitted to the legacy PDCCH and USS may be transmitted to E-PDCCH. E-PDCCH to be used for USS transmission may be a first region corresponding to the Type-1 E-PDCCH structure or a second region corresponding to the Type-2 E-PDCCH structure. The UE may obtain cell-specific control information by performing blind decoding in CSS of the legacy PDCCH region, and may obtain UE-specific control information by performing blind decoding in USS of E-PDCCH.

Alternatively, CSS and USS may be transmitted to E-PDCCH, CSS may be transmitted on a first region corresponding to the Type-1 E-PDCCH structure, and USS may be transmitted on a second region corresponding to the Type-2 E-PDCCH structure. If USS is transmitted within the first region, the region corresponding to CSS and the other region corresponding to USS may be separated from each other. Preferably, USS may be transmitted within the second region. In this case, the UE may obtain cell-specific control information by performing blind decoding on the first region over E-PDCCH, and may obtain UE-specific control information by performing blind decoding on the second region.

In the above-mentioned description, if USS is transmitted to any one of the first region and the second region, the BS may directly signal not only USS allocation information but also specific information indicating which one of a first region and a second region is used as a region to be transmitted through the corresponding USS. If the corresponding information is implicitly signaled without using direct signaling, the following first and second examples may be used.

In the first example, specific information indicating which one of the first region and the second region will be used for USS transmission may be decided according to the transmission mode. For example, in case of the UE having a transmission mode of 9, it is premised that USS is transmitted on the second region, the CCE structure is decided in the corresponding region, and blind decoding is then performed.

In the second example, specific information indicating which one of the first region and the second region will be used for USS transmission may be decided according to the DCI format. For example, according to Tx mode '9', in case of a fallback DCI format (DCI format 1A), the corresponding information may be transmitted. In case of DCI format (DCI format 2C) associated with data transmission based on a plurality of layers, the corresponding information may be transmitted. For DCI format 1A, the UE may perform blind decoding in the first region. For DCI format 2C, the UE may perform blind decoding in the second region.

Figure 14:
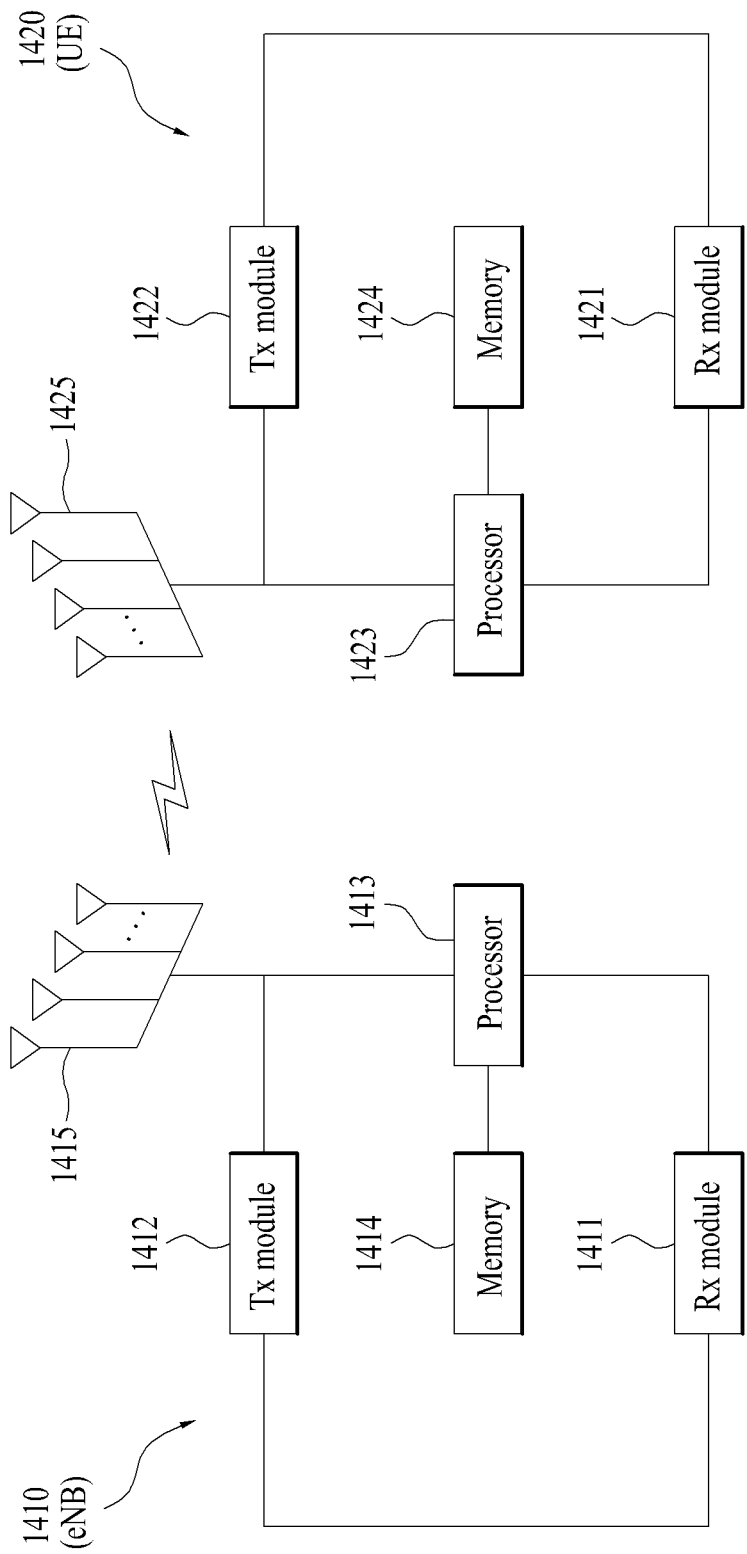
FIG. 14 is a block diagram illustrating a BS (or eNB) device and a UE device according to the embodiments.

FIG. 14 is a block diagram illustrating a BS (eNB) device and a UE device according to the embodiments of the present invention.

Referring to FIG. 14, the BS device 1410 according to the present invention may include a reception (Rx) module 1411, a transmission (Tx) module 1412, a processor 1413, a memory 1414, and a plurality of antennas 1415. The plurality of antennas 1415 indicates the BS device for supporting MIMO transmission and reception. The reception (Rx) module 1411 may receive a variety of signals, data and information on an uplink starting from the UE. The Tx module 1412 may transmit a variety of signals, data and information on a downlink for the UE. The processor 1413 may provide overall control to the transmission point apparatus 1410. The processor 1413 may be configured to implement the embodiments of the present invention.

The processor 1413 of the BS device 1410 processes information received at the BS device 1410 and transmission information to be transmitted externally. The memory 1414 may store the processed information for a predetermined time. The memory 1414 may be replaced with a component such as a buffer (not shown).

Referring to FIG. 14, the UE device 1420 may include an Rx module 1421, a Tx module 1422, a processor 1423, a memory 1424, and a plurality of antennas 1425. The plurality of antennas 1425 indicates a UE apparatus supporting MIMO transmission and reception. The Rx module 1421 may receive downlink signals, data and information from the BS (eNB). The Tx module 1422 may transmit uplink signals, data and information to the BS (eNB). The processor 1423 may provide overall control to the UE apparatus 1420. The processor 1423 may be configured to implement the embodiments of the present invention.

The processor 1423 of the UE apparatus 1420 processes information received at the UE device 1420 and transmission information to be transmitted externally. The memory 1424 may store the processed information for a predetermined time. The memory 1424 may be replaced with a component such as a buffer (not shown).

The specific configurations of the BS device and the UE device may be implemented such that the various embodiments of the present invention are performed independently or two or more embodiments of the present invention are performed simultaneously. Redundant matters will not be described herein for clarity.

The description of the BS device 1410 shown in FIG. 14 may be applied to the eNB (BS), or may also be applied to a relay node (RN) acting as a DL transmission entity or UL reception entity without departing from the scope or spirit of the present invention. In addition, the description of the UE apparatus 1420 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

Although the embodiments of the present invention have been disclosed on the basis of the 3GPP LTE mobile communication system, the embodiments can be equally or equivalently applied to various wireless communication systems.

The invention claimed is:

1. A method for obtaining control information of a user equipment (UE) in a wireless communication system, the method comprising:
receiving a parameter for determining a type-1 enhanced physical downlink control channel (E-PDCCH) region and resource block (RB) allocation information of a type-2 E-PDCCH region, the type-1 E-PDCCH region and the type-2 E-PDCCH region including E-PDCCH candidates;
determining the type-1 E-PDCCH region using the parameter and the type-2 E-PDCCH region using the RB allocation information; and
performing blind decoding in the type-1 E-PDCCH region and the type-2 E-PDCCH region to receive a type-1 E-PDCCH and a type-2 E-PDCCH,
wherein the type-1 E-PDCCH region includes a plurality of RB aggregations which are not contiguous to each other on a subframe, composed of one or more contiguous RBs, and the type-2 E-PDCCH region includes one or more RB aggregations on the subframe,
wherein the parameter includes only one of a number of contiguous RBs contained in each of the RB aggregations of type-1 E-PDCCH regions (M) or a number of RBs contained in each of interleaving areas between two RB aggregations of a type-1 E-PDCCH (K), and
wherein if the parameter includes M, K is differently determined according to whether (N−4*M) is divided by 3 without a remainder or not,
where N is a number of RBs contained in a downlink bandwidth, and * is a multiplication operator.

2. The method according to claim 1, wherein if M is received and (N−4*M) is divided by 3 without a remainder, K is determined to be (N−4*M)/3.

3. The method according to claim 1, wherein if M is received and (N−4*M) is not divided by 3 without a remainder:
a number of RBs contained in a center interleaving area which includes a center frequency of a downlink bandwidth among interleaving areas (K1) is determined to be floor((N−4*M)/3)+((N−4*M) mod 3), and
a number of RBs contained in each of edge interleaving areas which do not include the center frequency among interleaving areas (K2) is determined to be floor((N−4*M)/3, where floor is a floor function, and mod is a modulo operator.

4. The method according to claim 1, wherein a type-1 E-PDCCH includes cell-specific control information, and a type-2 E-PDCCH includes UE-specific control information.

5. The method according to claim 1, wherein each of the type-1 E-PDCCH region and the type-2 E-PDCCH region does not include a resource region indicated by a physical control format indicator channel (PCFICH) in the subframe.

6. A method for transmitting control information of a base station (BS) in a wireless communication system, the method comprising:
transmitting a parameter for determining a type-1 enhanced physical downlink control channel (E-PDCCH) region and resource block (RB) allocation information of a type-2 E-PDCCH region, the type-1 E-PDCCH region and the type-2 E-PDCCH region including E-PDCCH candidates; and
transmitting downlink control information using the type-1 E-PDCCH region which is determined by using the parameter and a second region the type-2 E-PDCCH region which is determined by using the RB allocation information,
wherein the type-1 E-PDCCH region includes a plurality of RB aggregations which are not contiguous to each other on a subframe, composed of one or more contiguous RBs, and the type-2 E-PDCCH region includes one or more RB aggregations on the subframe,
wherein the parameter includes only one of a number of contiguous RBs contained in each of the RB aggregations of type-1 E-PDCCH regions (M) or a number of RBs contained in each of interleaving areas between two RB aggregations of a type-1 E-PDCCH (K), and wherein if the parameter includes M, K is differently determined according to whether (N−4*M) is divided by 3 without a remainder or not, where N is a number of RBs contained in a downlink bandwidth, and * is a multiplication operator.

7. The method according to claim 6, wherein if M is transmitted and (N−4*M) is divided by 3 without a remainder, K is determined to be (N−4*M)/3.

8. The method according to claim 6, wherein if M is transmitted and (N−4*M) is not divided by 3 without a remainder:

a number of RBs contained in a center interleaving area which includes a center frequency of a downlink bandwidth among interleaving areas (K1) is determined to be floor((N−4*M)/3)+((N−4*M) mod 3), and a number of RBs contained in each of edge interleaving areas which do not include the center frequency among interleaving areas (K2) is determined to be floor((N−4*M)/3), where floor is a floor function, and mod is a modulo operator.

9. The method according to claim 6, wherein the type-1 E-PDCCH includes cell-specific control information, and a type-2 E-PDCCH includes UE-specific control information.

10. The method according to claim 6, wherein each of the type-1 E-PDCCH region and the type-2 E-PDCCH region does not include a resource region indicated by a physical control format indicator channel (PCFICH) in the subframe.

11. A user equipment (UE) for use in a wireless communication system, the UE comprising:

a reception (Rx) module; and a processor, wherein the Rx module receives a parameter for determining a type-1 enhanced physical downlink control channel (E-PDCCH) region and resource block (RB) allocation information of a type-2 E-PDCCH region, and the type-1 E-PDCCH region and the type-2 E-PDCCH region include E-PDCCH candidates, wherein the processor determines the type-1 E-PDCCH region using the parameter and the type-2 E-PDCCH region using the RB allocation information, and performs blind decoding in the type-1 E-PDCCH region and the type-2 E-PDCCH region to receive a type-1 E-PDCCH and a type-2 E-PDCCH, wherein the type-1 E-PDCCH region includes a plurality of RB aggregations which are not contiguous to each other on a subframe, composed of one or more contiguous RBs, and the type-2 E-PDCCH region includes one or more RB aggregations on the subframe, wherein the parameter includes only one of a number of contiguous RBs contained in each of the RB aggregations of type-1 E-PDCCH regions (M) or a number of RBs contained in each of interleaving areas between two RB aggregations of a type-1 E-PDCCH (K), and wherein if the parameter includes M, K is differently determined according to whether (N−4*M) is divided by 3 without a remainder or not, where N is a number of RBs contained in a downlink bandwidth, and * is a multiplication operator.

12. A base station (BS) device for use in a wireless communication system, the BS device comprising:

a transmission (Tx) module; and a processor, wherein the Tx module transmits a parameter for determining a type-1 enhanced physical downlink control channel (E-PDCCH) region and resource block (RB) allocation information of a type-2 E-PDCCH region, and the type-1 E-PDCCH region and the type-2 E-PDCCH region include E-PDCCH candidates, wherein the processor transmits downlink control information using the type-1 E-PDCCH region which is determined by using the parameter and the type-2 E-PDCCH region which is determined by the RB allocation information, wherein the type-1 E-PDCCH region includes a plurality of RB aggregations which are not contiguous to each other on a subframe, composed of one or more contiguous RBs, and the type-2 E-PDCCH region includes one or more RB aggregations on the subframe, wherein the parameter includes only one of a number of contiguous RBs contained in each of the RB aggregations of type-1 E-PDCCH regions (M) or a number of RBs contained in each of interleaving areas between two RB aggregations of a type-1 E-PDCCH (K), and wherein if the parameter includes M, K is differently determined according to whether (N−4*M) is divided by 3 without a remainder or not, where N is a number of RBs contained in a downlink bandwidth, and * is a multiplication operator.

* * * * *